United States Patent
Spadacini et al.

(10) Patent No.: US 10,968,743 B2
(45) Date of Patent: Apr. 6, 2021

(54) METHOD FOR THE ASSEMBLY OF A RADIAL TURBINE AND RADIAL TURBINE

(71) Applicant: EXERGY S.P.A., Bologna (IT)

(72) Inventors: Claudio Spadacini, Verbania Suna (IT); Dario Rizzi, Bisuschio (IT)

(73) Assignee: EXERGY INTERNATIONAL S.R.L., Olgiate Olona (IT)

( * ) Notice: Subject to any disclaimer, the term of this patent is extended or adjusted under 35 U.S.C. 154(b) by 38 days.

(21) Appl. No.: 16/314,729

(22) PCT Filed: Jun. 8, 2017

(86) PCT No.: PCT/IB2017/053392
§ 371 (c)(1),
(2) Date: Jan. 2, 2019

(87) PCT Pub. No.: WO2018/002748
PCT Pub. Date: Jan. 4, 2018

(65) Prior Publication Data
US 2019/0316469 A1 Oct. 17, 2019

(30) Foreign Application Priority Data
Jul. 1, 2016 (IT) .................. 102016000068831

(51) Int. Cl.
*F01D 1/28* (2006.01)
*F01D 9/04* (2006.01)
(Continued)

(52) U.S. Cl.
CPC ............... *F01D 1/28* (2013.01); *F01D 5/041* (2013.01); *F01D 9/04* (2013.01); *F01D 9/045* (2013.01);
(Continued)

(58) Field of Classification Search
CPC ...... F01D 1/28; F01D 1/06; F01D 1/14; F01D 9/045; F01D 5/041
See application file for complete search history.

(56) References Cited

U.S. PATENT DOCUMENTS

| 889,164 A | 5/1908 | Welch |
|---|---|---|
| 1,845,955 A | 2/1932 | Bonom |

(Continued)

FOREIGN PATENT DOCUMENTS

| DE | 310434 C | 1/1919 |
|---|---|---|
| DE | 320950 C | 5/1920 |

(Continued)

OTHER PUBLICATIONS

Oct. 25, 2017 International Search Report issued in International Patent Application No. PCT/IB2017/053392.
(Continued)

*Primary Examiner* — Juan G Flores

(57) ABSTRACT

A method for the assembly of a counter-rotating radial turbine includes: preparing a central case; pre-assembling a first turbine unit and a second turbine unit, each including: a half-case delimiting a housing; a rotating unit with a shaft housed and rotatably supported in the housing and that is free to rotate about an axis of rotation with respect to said housing; a rotor disc joined to and overhanging a distal end of the shaft and having a front bladed face facing the opposite side with respect to the half-case. The method includes coupling the first pre-assembled turbine unit and the second pre-assembled turbine unit to the central case so as to arrange the front bladed face of the first rotor disc in front of the front bladed face of the second rotor disc, wherein, following the coupling process, the first half-case and the second half-case laterally close the central case.

5 Claims, 5 Drawing Sheets

(51) Int. Cl.
*F01D 25/26* (2006.01)
*F01D 5/04* (2006.01)
(52) U.S. Cl.
CPC .......... *F01D 25/26* (2013.01); *F05D 2230/60* (2013.01)

(56) References Cited

U.S. PATENT DOCUMENTS

| | | | | |
|---|---|---|---|---|
| 1,910,845 | A | * 5/1933 | Lysholm | .................. F01D 1/28 415/86 |
| 2,318,990 | A | 5/1943 | Doran | |
| 3,656,300 | A | 4/1972 | Wikdahl | |

FOREIGN PATENT DOCUMENTS

| | | | | | |
|---|---|---|---|---|---|
| DE | 484083 | C | | 10/1929 | |
| FR | 427037 | A | * | 7/1911 | ............... F01D 1/28 |
| FR | 453638 | A | * | 6/1913 | ............... F01D 1/28 |
| FR | 525845 | A | * | 9/1921 | ............... F01D 1/06 |
| FR | 733229 | A | | 10/1932 | |
| GB | 292079 | A | | 7/1928 | |

OTHER PUBLICATIONS

Oct. 25, 2017 Written Opinion issued in International Patent Application No. PCT/IB2017/053392.

* cited by examiner

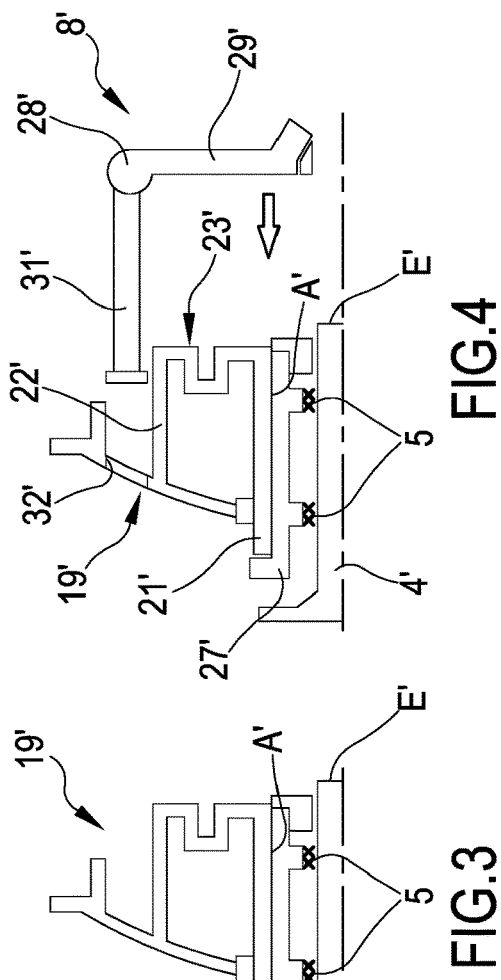
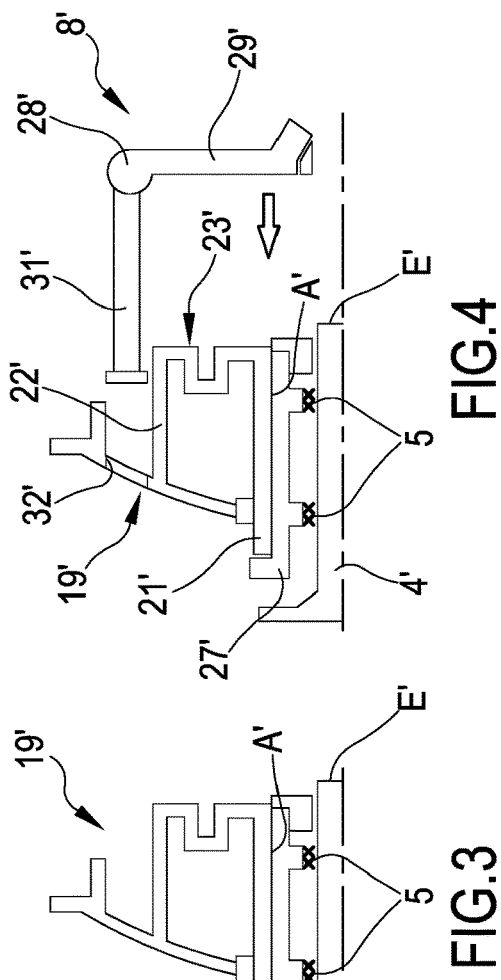
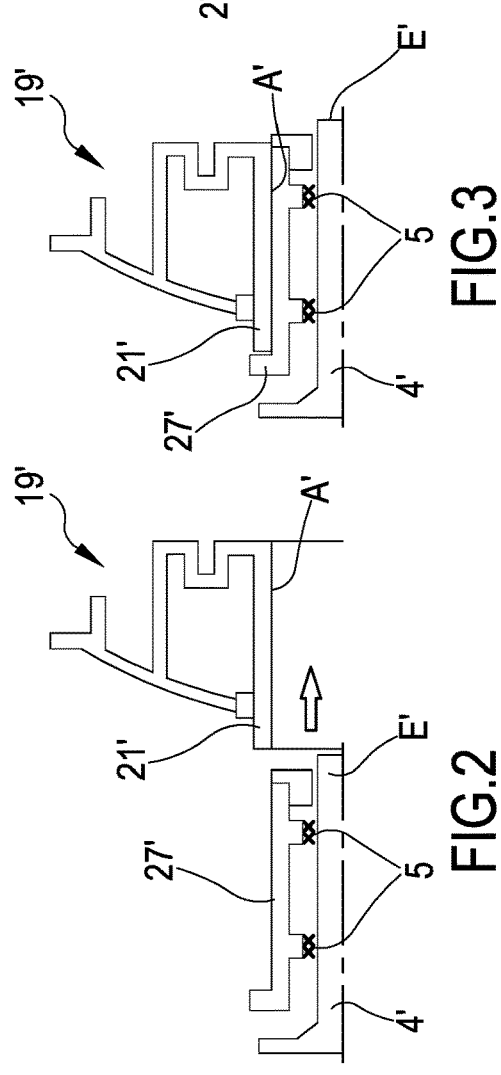
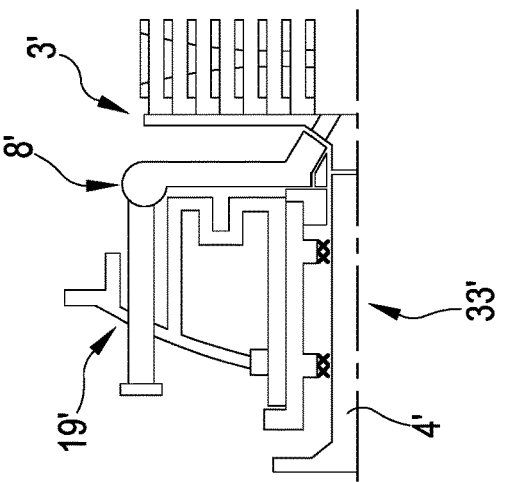
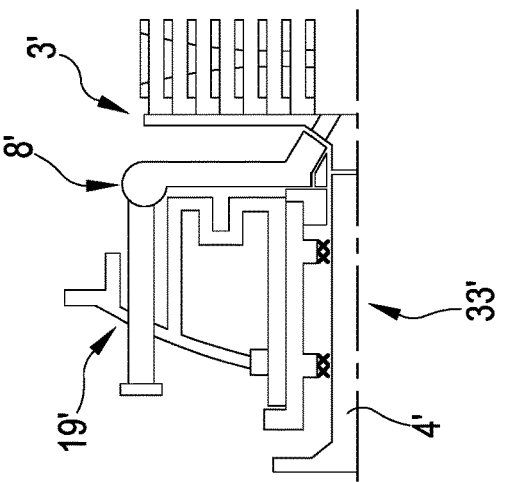
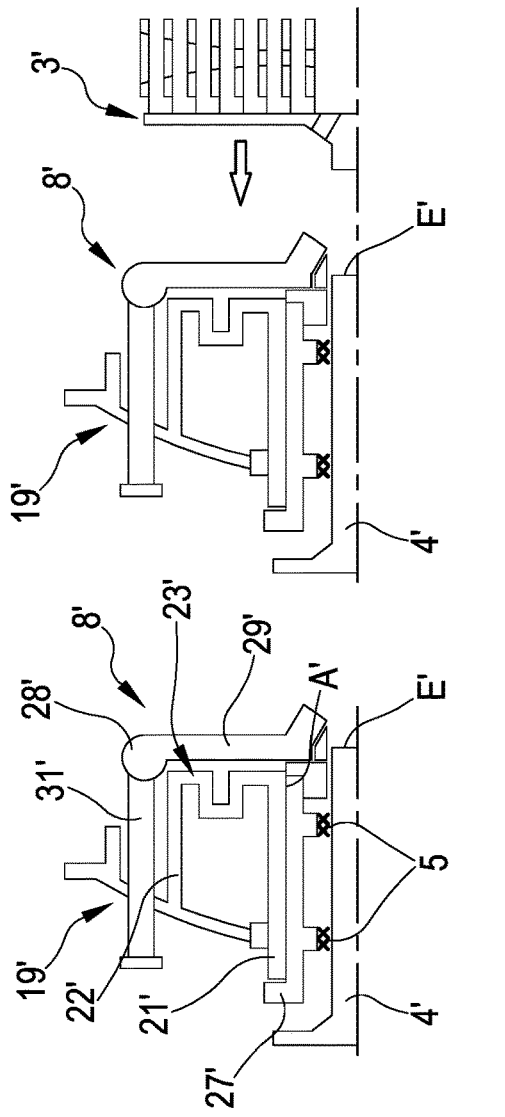
FIG.2  FIG.3  FIG.4
FIG.5  FIG.6  FIG.7

METHOD FOR THE ASSEMBLY OF A RADIAL TURBINE AND RADIAL TURBINE

FIELD OF THE INVENTION

The object of the present invention is a counter-rotating radial turbine utilized in plants for the production of electrical energy (power plants) and a method for the assembly thereof. In particular, the present invention focuses on the structure of the turbine, which is such as to enable simplification of the assembly process and therefore simplification of production resulting in a more efficient production process, reduced production costs and increased reliability.

A radial turbine is understood as a turbine in which the flow of the fluid with which it exchanges energy is prevalently directed in a radial direction with respect to the axis of rotation of said turbine. A counter-rotating radial turbine is understood as a radial turbine equipped with two rotor discs facing each other and rotating in opposite directions.

Preferably, but not exclusively, the present invention refers to radial expansion turbines utilized in plants for the production of power by means of the Rankine cycle that uses water vapour or by means of the organic Rankine cycle (ORC).

Preferably, but not exclusively, the present invention refers to counter-rotating expansion turbines of the centrifugal or "outflow" type, it being understood with this term that the flow of fluid is directed radially from the centre towards the radially external periphery of the turbine.

BACKGROUND OF THE INVENTION

Public document U.S. Pat. No. 1,845,955 illustrates a steam turbine of a radial type equipped with two rotors, the concentric shafts of which are connected together at one end by a differential mechanism and at the other end they are provided with a clutch, whereby said shafts can be connected to a third shaft. All members of the turbine are assembled, by means of screws, concentrically with respect to the axis of the turbine. The frame of the turbine comprises a base on which a cylindrical container is realized and closed by lateral covers screwed to the base. One of the covers extends laterally in the form of a sleeve. A ring is joined to the other of the two covers, said ring being connected to a cylinder, which is, in turn, closed by a cover.

Document DE484083 illustrates a radial turbine with two counter-rotating rotors. The two rotors are housed in an inner casing, which is, in turn, housed in an outer casing.

Document U.S. Pat. No. 3,656,300 illustrates an oppositely rotating turbine of the Ljungstrom type, comprising two rotors supported by hollow shafts and housed in a stationary casing.

Documents DE310434 and DE320950 illustrate two more examples of counter-rotating turbines.

Document U.S. Pat. No. 1,910,845 illustrates a counter-rotating Ljungstrom radial turbine equipped with two shafts and two rotors that are facing each other and counter-rotating. The turbine comprises a volute and two fixed lateral elements. The two shafts pass through an outer casing and through the fixed lateral elements solidly constrained to the outer casing.

Document FR733229 illustrates a gas or steam turbine of the counter-rotating type that is entirely like the one illustrated in U.S. Pat. No. 1,910,845. The turbine comprises an outer casing, an intermediate element, two lateral elements and two shafts that bear the rotors.

Document U.S. Pat. No. 889,164 illustrates a centrifugal pump with two counter-rotating rotors. The pump comprises a side wall and two circular end walls. The two circular walls are provided with bearings and two shafts supported by said bearings, respectively.

SUMMARY

In this regard, the Applicant has observed that the counter-rotating turbines of the prior art, such as those cited and briefly described above, have structures that are so complex (see for example DE 484083 and U.S. Pat. No. 1,845,955, which, among other things, comprises the assembly of one shaft inside the other) as to require a number of resources not only for the realization of the elements composing them, but also for their assembly and possible disassembly (for repairs, maintenance, etc.). As concerns this aspect, the other documents cited above do not illustrate significant aspects, for the drawings are purely schematic.

The Applicant has also observed that the Ljungstrom turbines such as those illustrated in U.S. Pat. No. 1,910,845 and FR733229 do not additionally perform the function of supporting the shafts bearing the rotors. These shafts simply pass through the respective case, the latter possibly being provided with seals, but they are connected to and supported by elements external to the turbine, presumably such as by respective generators.

The Applicant has thus perceived that there is a need to offer a counter-rotating radial turbine that makes it possible to reduce production and maintenance costs, while also increasing the reliability and sturdiness thereof.

In particular, the Applicant has noted that there is a need to:

simplify the structure of the elements making up the counter-rotating radial turbine and to reduce the number of such elements;

enable quick and easy assembly of these elements and, if needed, also enable quick and easy disassembly of the turbine;

ensure the sturdiness and structural precision of the turbine.

The Applicant has found that the objectives indicated above can be achieved by pre-assembling the two rotor units of the counter-rotating turbine to then associate them en bloc with a central containment case that also functions as a reference for centring one unit with respect to the other. In other words, each one of the two turbine rotor units, made up of a small number of elements, is assembled in advance by carrying out a simple axial coupling process for coupling said elements. Once the pre-assembled units have been formed, the shaft and the rotor of each unit is rotatably supported in the unit itself. Subsequently, each one of the two turbine units is moved/managed as a block and coupled to the central case.

In the present description and in the appended claims, the adjective "axial" is used to define a direction directed parallel to an axis of rotation "X-X" of the turbine. The adjective "radial" is used to define a direction directed in the same manner as the radii extending perpendicularly from the axis of rotation "X-X". The adjective "circumferential" is understood as referring to directions tangent to circumferences coaxial with the axis of rotation "X-X".

More specifically, according to a first independent aspect, the present invention concerns a method for the assembly of a counter-rotating radial turbine.

The method comprises preparing a central case; pre-assembling a first turbine unit comprising: a first half-case delimiting a first housing, preferably an axially through housing; a first rotating unit comprising a first shaft housed and rotatably supported in the first housing and that is free to rotate about a first axis of rotation with respect to said first housing; a first rotor disc joined to and overhanging a distal end of the first shaft and having a front bladed face facing the opposite side with respect to the first half-case; pre-assembling a second turbine unit comprising: a second half-case delimiting a second housing, preferably an axially through housing; a second rotating unit comprising a second shaft housed and rotatably supported in the second housing and that is free to rotate about a second axis of rotation with respect to said second housing; a second rotor disc joined to and overhanging a distal end of the second shaft and having a front bladed face facing the opposite side with respect to the second half-case.

The method further comprises coupling the first pre-assembled turbine unit and the second pre-assembled turbine unit to the central case so as to arrange the front bladed face of the first rotor disc in front of the front bladed face of the second rotor disc.

Following the coupling process, the first half-case and the second half-case laterally close the central case. The two rotor discs with their annular arrays of radially alternated blades delimit a working/transit space for a working fluid.

In accordance with a second independent aspect, the present invention also concerns a counter-rotating radial turbine.

The counter-rotating radial turbine comprises: a central case; a first pre-assembled turbine unit comprising: a first half-case delimiting a first housing; a first rotating unit comprising a first shaft housed and rotatably supported in the first housing and that is free to rotate about a first axis of rotation with respect to said first housing; a first rotor disc joined to and overhanging a distal end of the first shaft and having a front bladed face facing the opposite side with respect to the first half-case.

The turbine further comprises a second pre-assembled turbine unit comprising: a second half-case delimiting a second housing; a second rotating unit comprising a second shaft housed and rotatably supported in the second housing and that is free to rotate about a second axis of rotation with respect to said second housing; a second rotor disc joined to and overhanging a distal end of the second shaft and having a front bladed face facing the opposite side with respect to the second half-case.

The first pre-assembled turbine unit and the second pre-assembled turbine unit are coupled to the central case with the front bladed face of the first rotor disc located in front of the front bladed face of the second rotor disc so as to delimit a working space for a working fluid.

The central case has a first opening and a second opening, which are axially opposite each other and configured to receive the first half-case and the second half-case, respectively, and wherein the first half-case and the second half-case close said first opening and said second opening, respectively.

The radial turbine described hereinabove is preferably assembled according to the method of the first aspect or of at least one of the following aspects.

The Applicant has verified that the present invention makes it possible to limit assembly time, thereby optimizing the process for production of the turbine and reducing production costs. In this manner, the production of counter-rotating turbines can be brought to a higher level of industrialization.

At the same time, the precision of the assemblies can be improved and this implies improved quality of the turbine with a positive impact on sturdiness and reliability.

Moreover, the Applicant has verified that the solution claimed makes quick and easy disassembly of the turbine possible so as to gain access to the internal parts thereof, resulting in savings in terms of time and costs as regards repairs and/or maintenance procedures.

In particular, the production of turbine units that incorporate the supports for the shaft and also the shaft itself with the rotor allows access to the interior of the machine, for example to the blades, without having to slide the shaft and/or any bearings off from their seats.

In one aspect, the central case has a tubular shape. The central case is preferably shaped in the form of a barrel. Preferably, the tubular central case is a single body. In one aspect, coupling the first pre-assembled turbine unit and the second pre-assembled turbine unit to the central case comprises: axially and at least partially inserting the first pre-assembled turbine unit and the second pre-assembled turbine unit in a first opening and in a second opening of the central case, respectively, the openings being axially opposite each other.

The Applicant has verified that this structure is structurally very sturdy and also that the tubular body in a single body makes it possible to perform a centring function for centring the turbine units already during the assembly process, in addition to performing this function during operation of the turbine.

In one aspect, the central case comprises a first and a second semi-cylinder. Preferably, the two semi-cylinders are coupled to each other in a plane parallel to the axes of rotation or that contains the axes of rotation of the rotating units.

In one aspect, coupling the first pre-assembled turbine unit and the second pre-assembled turbine unit to the central case comprises: arranging the first pre-assembled turbine unit and the second pre-assembled turbine unit in the first semi-cylinder and applying the second semi-cylinder onto the first semi-cylinder.

Preferably, the first semi-cylinder is the lower one and the first preassembled turbine unit and the second preassembled turbine unit are set therein before closing the case, arranging, preferably from above, the second semi-cylinder on the first semi-cylinder.

In one aspect, the central case comprises a radially internal cylindrical wall and a radially external cylindrical wall, said walls delimiting together an annular discharge space. In one aspect, the radially internal cylindrical wall has a bladed diffuser circumferentially arranged around the working space and configured to set said working space in fluid communication with the annular discharge space. This structure makes the central case rigid and sturdy and the turbine set compact.

In one aspect, the bladed diffuser comprises a plurality of stator blades that structurally connect opposite axial portions of the radially internal cylindrical wall and said stator blades delimit together a plurality of substantially radial passages for the working fluid. In addition to performing their aerodynamic function, the stator blades connect the opposite axial portions of the radially internal cylindrical wall, making the set very rigid.

In one aspect, the bladed diffuser comprises a pair of annular dividers located at opposite axial ends of the stator blades. In addition to guiding the fluid in transit, the annular dividers also stiffen the set.

In one aspect, wherein the radially internal cylindrical wall of the central case has a first cylindrical abutment surface located at the first opening of said central case and wherein the first half-case has a first cylindrical centring surface coaxial with the first axis of rotation and coupled to said first cylindrical abutment surface.

In one aspect, the radially internal cylindrical wall of the central case has a second cylindrical abutment surface located at the second opening of said central case and wherein the second half-case has a second cylindrical centring surface coaxial with the second axis of rotation and coupled to said second cylindrical abutment surface.

In one aspect, coupling the first pre-assembled turbine unit to the central case comprises: coupling a first cylindrical centring surface of the first half-case coaxial with the first axis of rotation to a first cylindrical abutment surface of the central case located at a first axial opening of said central case.

In one aspect, coupling the second pre-assembled turbine unit to the central case comprises: coupling a second cylindrical centring surface of the second half-case coaxial with the second axis of rotation to a second cylindrical abutment surface of the central case located at a second opening of said central case.

The surfaces cited make it possible to centre the rotating units with respect to the case, and above all, with respect to each other so as to prevent damaging interference of the rotating parts (particularly of the blades of the rotor discs) during operation and to ensure proper coupling between the fluid-seals in relative movement.

In one aspect, the first cylindrical abutment surface and the first cylindrical centring surface have a first diameter "d1" ranging between about 110% and 120% of a diameter "ds" of an outermost radial stage of the first rotor disc or of the second rotor disc.

In one aspect, the second cylindrical abutment surface and the second cylindrical centring surface have a second diameter "d2" ranging between about 110% and 120% of a diameter "ds" of an outermost radial stage of the first rotor disc or of the second rotor disc.

In one aspect, an inner diameter "d" of the radially internal cylindrical wall ranges between about 110% and 120% of a diameter "ds" of an outermost radial stage of the first rotor disc or of the second rotor disc.

These dimensions contribute to stiffening the entire structure of the turbine, given that the diameters of the structural part are only slightly greater than the diameter of the rotor discs.

In one aspect, the central case has a first annular abutment surface located at the first opening, and wherein the first half-case has a first annular reference surface coaxial and perpendicular to the first axis of rotation and coupled to said first annular abutment surface, and wherein the first annular abutment surface is substantially located at the radially internal cylindrical wall.

In one aspect, the central case has a second annular abutment surface located at the second opening and wherein the second half-case has a second annular reference surface coaxial and perpendicular to the second axis of rotation and coupled to said second annular abutment surface, and wherein the second annular abutment surface is substantially located at the radially internal cylindrical wall.

In one aspect, coupling the first pre-assembled turbine unit to the central case comprises: coupling a first annular reference surface of the first half-case coaxial with and perpendicular to the first axis of rotation to a first annular abutment surface of the central case located at a first axial opening of said central case.

In one aspect, coupling the second pre-assembled turbine unit to the central case comprises: coupling a second annular reference surface of the second half-case coaxial with and perpendicular to the second axis of rotation to a second annular abutment surface of the central case located at a second opening of said central case.

The surfaces cited make it possible to fix the axial position of the rotating units with respect to the case, and above all, with respect to each other in this case as well to prevent damaging interference of the rotating parts during operation and to ensure proper coupling between the seals in relative movement.

In general, the cited coupling surfaces make it possible to use the central case, which is very rigid, to fix the relative positions of the two rotor discs and their blades accurately, during assembly and during operation of the turbine.

In one aspect, each one of said first and second half-cases has a substantially box-like structure, preferably in a single piece, so as to offer a high degree of rigidity.

In one aspect, the first half-case comprises: a first main wall; a first tubular body that extends from said first main wall and internally delimits the first housing.

In one aspect, the first main wall comprises: a first cylindrical body coaxial with the first tubular body and that is external with respect to said first tubular body, a first connection portion radially extending between the first cylindrical body and the first tubular body, and a first radially external portion extending from one end of the first cylindrical body. Preferably, the first tubular body, the first connection portion, the first cylindrical body and in the first radially external portion are substantially S-shaped in an axial half-section.

In one aspect, the first half-case comprises a first auxiliary annular wall that extends as an appendage from the first cylindrical body and has a radially internal edge located in proximity to a radially external surface of the first tubular body. Preferably, the radially internal edge grazes the radially external surface and, like a sliding block, it is free to translate axially, with respect to the first tubular body. This solution ensures flexural rigidity, but it prevents the generation of internal stress caused by relative axial movements particularly due to thermal gradients generated during operation of the turbine.

In one aspect, the first rotating unit comprises: a first support sleeve housed in the first housing and solidly connected to the first half-case, wherein the first support sleeve internally delimits a seat for the first shaft.

In one aspect, the first support unit comprises bearings, preferably rolling elements, preferably roller bearings, radially interposed between the first support sleeve and the first shaft to enable free rotation of said first shaft in said first support sleeve.

In one aspect, the second half-case comprises: a second main wall; a second tubular body that extends from said second main wall and internally delimits the second housing.

In one aspect, the second main wall comprises: a second cylindrical body coaxial with the second tubular body and that is external with respect to said second tubular body, a second connection portion radially extending between the second cylindrical body and the second tubular body, and a second radially external portion extending from one end of the second cylindrical body. Preferably, the second tubular body, the second connection portion, the second cylindrical body and the second radially external portion are substantially S-shaped (upside-down S-shaped) in an axial half-section.

In one aspect, the second half-case comprises a second auxiliary annular wall that extends as an appendage from the second cylindrical body and has a radially internal edge located in proximity to a radially external surface of the second tubular body. Preferably, the radially internal edge grazes the radially external surface and, like a sliding block, it is free to translate axially, with respect to the second tubular body.

In one aspect, the second rotating unit comprises: a second support sleeve housed in the second housing and solidly connected to the second half-case, wherein the second support sleeve internally delimits a seat for the second shaft.

In one aspect, the second rotating unit comprises bearings, preferably rolling elements, preferably roller bearings, radially interposed between the second support sleeve and the second shaft to enable free rotation of said second shaft in said second support sleeve.

In one aspect, pre-assembling the first turbine unit comprises: preparing the first half-case delimiting the first housing, preferably preparing a first rotating unit comprising a first support sleeve and the first shaft rotatably housed in the first support sleeve, preferably housing the first rotating unit in the first housing and fixing the first support sleeve to the first half-case.

In one aspect, pre-assembling the second turbine unit comprises: preparing the second half-case delimiting the second housing, preferably preparing a second rotating unit comprising a second support sleeve and the second shaft rotatably housed in the second support sleeve, preferably housing the second rotating unit in the second housing and fixing the second support sleeve to the second half-case.

In other words, the first rotating unit and the second rotating unit are also pre-assembled and then inserted in and joined to the respective half-cases. This solution enables disassembly of the rotating unit from the respective half-case without having to slide off the shaft and/or any bearings from their seats.

In one aspect, pre-assembling the first turbine unit comprises: preparing the first rotor disc and joining it to the distal end of the first shaft. In one aspect, pre-assembling the second turbine unit comprises: preparing the second rotor disc and joining it to the distal end of the second shaft.

It is preferably envisioned that the first rotating unit be housed in the first housing before joining the first rotor disc to the distal end of the first shaft. It is preferably envisioned that the second rotating unit be housed in the second housing before joining the second rotor disc to the distal end of the second shaft.

In other words, the bladed rotor disc is joined to the shaft of the respective rotating unit after pre-assembly of said rotating unit.

Preferably, the first rotating unit is housed in the first housing by inserting it in one end of said first housing and having the distal end protrude from the opposite end of said first housing. Preferably, the second rotating unit is housed in the second housing by inserting it in one end of said second housing and having the distal end protrude from the opposite end of said second housing.

In other words, each bladed rotor disc is joined to the shaft of the respective rotating unit after mounting said rotating unit in the respective half-case.

In one aspect, the first pre-assembled turbine unit comprises first pipes configured to set the working space in fluid communication with the exterior.

In one aspect, the second pre-assembled turbine unit comprises second pipes configured to set the working space in fluid communication with the exterior.

Preferably, the first pipes are defined by a first pre-assembled set in which said first pipes are for example joined to each other by welding. Preferably, in a manner similar to that of the first pipes, the second pipes are defined by a second pre-assembled set in which said second pipes are for example joined to each other by welding.

In one aspect, pre-assembling the first turbine unit comprises: coupling first pipes to the first half-case, the first pipes being configured to set a working space delimited between the first rotor disc and the second rotor disc in fluid communication with the exterior. In one aspect, pre-assembling the second turbine unit comprises: coupling second pipes to the second half-case, the second pipes being configured to set a working space delimited between the first rotor disc and the second rotor disc in fluid communication with the exterior.

In one aspect, it is envisioned that a first set comprising the first pipes joined to each other, for example by welding, be pre-assembled and the first set of first pipes be applied en bloc to the first half-case. In one aspect, it is envisioned that a second set comprising the second pipes joined to each other, for example by welding, be pre-assembled and the second set of second pipes be applied en bloc to the second half-case.

In one aspect, the first pipes en bloc are applied to the first half-case by means of a relative axial translational movement. In one aspect, the second pipes en bloc are applied to the second half-case by means of a relative axial translational movement.

In one aspect, the first pipes are coupled to the first half-case prior to joining the first rotor disc to the distal end of the first shaft. In one aspect, the second pipes are coupled to the second half-case prior to joining the second rotor disc to the distal end of the second shaft.

The sets of pipes realized previously can also easily be associated with the half-cases en bloc, thereby making assembly a fast process.

In one aspect, the first pipes comprise a first toroidal fitting preferably housed in a first annular seat afforded in the first half-case and coaxial with the first axis of rotation. In one aspect, the second pipes comprise a second toroidal fitting preferably housed in a second annular seat afforded in the second half-case and coaxial with the second axis of rotation.

In one aspect, coupling the first pipes to the first half-case comprises: housing a first toroidal fitting in a first annular seat afforded in the first half-case and coaxial with the first axis of rotation. In one aspect, coupling the second pipes to the second half-case comprises: housing a second toroidal fitting in a second annular seat afforded in the second half-case and coaxial with the second axis of rotation. Each toroidal fitting is applied to the respective half-case by means of a simple axial movement.

In one aspect, the first pipes comprise a plurality of first radial conduits extending from the first toroidal fitting and converging towards the first axis of rotation. In one aspect, the second pipes comprise a plurality of second radial conduits extending from the second toroidal fitting and converging towards the second axis of rotation. The radial conduits lead into a radially internal portion of the working space. Each one of the first and the second set of pipes, the pipes being joined to each other (pre-assembled), comprises the respective toroidal fitting and the respective radial conduits.

In one aspect, the first pipes comprise at least one first pipe in fluid communication with the first toroidal fitting and exiting from the first half-case and/or from the central case. In one aspect, the second pipes comprise at least one second pipe in fluid communication with the second toroidal fitting and exiting from the second half-case and/or from the central case.

Preferably, each one of the first and the second set of pipes, the pipes being joined to each other (pre-assembled), comprises the respective toroidal fitting, the respective radial conduits and also the respective pipe(s) communicating with the exterior.

In one aspect, said at least one first pipe extends along a substantially axial direction through a first opening afforded in the first half-case. In one aspect, said at least one second pipe extends along a substantially axial direction through a second opening afforded in the second half-case.

In one aspect, coupling the first pipes to the first half-case comprises: axially inserting at least one first pipe through a first opening afforded in the first half-case. In one aspect, coupling the second pipes to the second half-case comprises: axially inserting at least one second pipe through a second opening afforded in the second half-case. Once they have been inserted, the first and the second pipe project out of the half-cases along axial directions. This solution makes it possible to mount the half-cases in the central case by inserting them in the first and the second opening of said central case without the pipes protruding from the half-cases interfering with elements of the central case.

In one aspect, said at least one first pipe extends along a direction substantially perpendicular to the first axis of rotation through a first passage afforded in the central case. In one aspect, said at least one second pipe extends along a direction substantially perpendicular to the second axis of rotation through a second passage afforded in the central case.

In one aspect, at least one first pipe and at least one second pipe are inserted in a respective first and second passage afforded in the central case, until they are connected to the first toroidal fitting and the second toroidal fitting, respectively. In this case, the first and the second pipe are not pre-assembled with the respective toroidal fittings and the respective radial conduits, but they are joined to the toroidal fitting after the first turbine unit and the second turbine unit are mounted on the central case.

The sets of pipes according to the invention form independent conduits, with respect to the half-cases, so that the incoming hot working fluid does not directly flow over the half-cases. The thermal gradients thus influence the structure of the turbine in a limited manner.

The present invention also concerns a plant for the production of electrical energy (power plant) for generating electrical energy, comprising a circuit for a working fluid; a radial turbine of the type described, connected to at least one electric power generator; wherein said circuit is in fluid communication with the first pipe and with the second pipe and with a discharge opening of the turbine.

Further characteristics and advantages will become more apparent from the detailed description of preferred, but not exclusive, embodiments of a method for the assembly of a counter-rotating radial turbine and of a counter-rotating radial turbine according to the present invention.

DESCRIPTION OF THE DRAWINGS

This description is provided herein below with reference to the attached drawings, which are provided solely for purpose of providing approximate and thus non-limiting examples, and of which:

FIGS. 2-7 illustrate a sequence for assembly of one of the units of the turbine appearing in FIG. 1;

DETAILED DESCRIPTION

With reference to the figures cited, a counter-rotating radial turbine in accordance with the present invention is indicated in its entirety by the reference number 1. The turbine illustrated in FIG. 1 is an expansion turbine of the outflow or centrifugal radial type, in which a working fluid (e.g. aqueous vapour or organic fluid) moves prevalently along radial directions outwards, that is, from a centre of the turbine towards peripheral edges of the rotor discs thereof.

Figure 1:
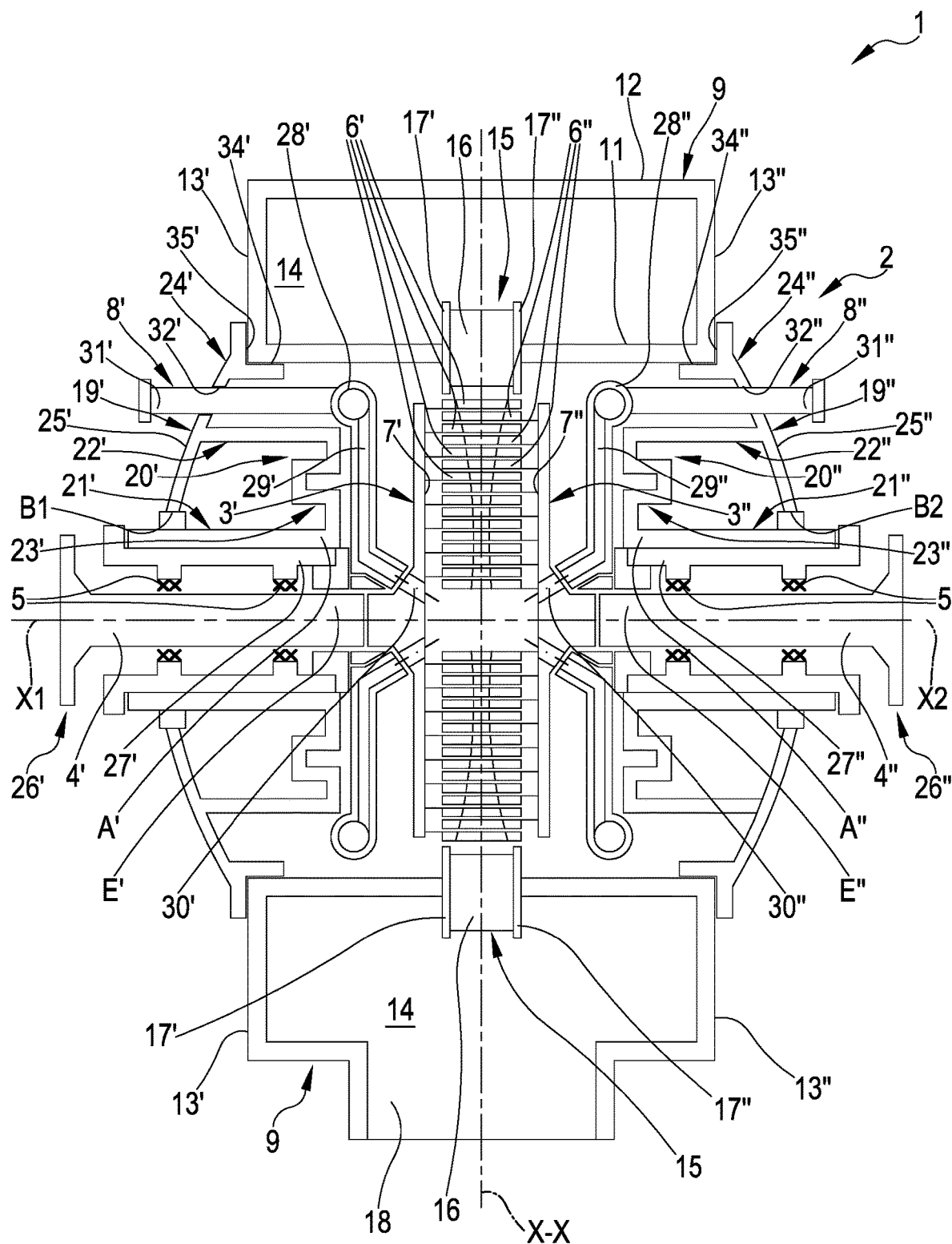
FIG. 1 shows a section view along an axial plane of a first embodiment of a turbine in accordance with the present invention.

The counter-rotating turbine 1 appearing in FIG. 1 comprises a fixed containment case 2 that internally houses a first rotor disc 3' and a second rotor disc 3". The two rotor discs 3', 3" can rotate freely, each one independently of the other, in the fixed case 2 about a respective first axis of rotation X1 and second axis of rotation X2, which are coincident. For this purpose, the first rotor disc 3' is solidly constrained to a respective first rotation shaft 4' mounted in the fixed case 2 by means of bearings 5. The second rotor disc 3" is solidly constrained to a respective second rotation shaft 4" mounted in the fixed case 2 by means of respective bearings 5. Said rotation shafts 4', 4" are connectable or connectable to at least one generator, not illustrated, configured to produce electrical energy from the rotation of the rotor discs 3', 3" brought about by the working fluid in expansion through the working space.

The first rotor disc 3' is equipped with a plurality of rotor blades 6' arranged in series of concentric rings on a respective front face 7' of said first rotor disc 3'. The second rotor disc 3" is equipped with a plurality of rotor blades 6" arranged in series of concentric rings on a respective front face 7" of said second rotor disc 3". The front face 7' of the first rotor disc 3' is located in front of the front face 7" of the second rotor disc 3" and the rotor blades 6' of the first disc 3' are radially alternated with the rotor blades 6" of the second disc 3". The rotor blades 6' of the first rotor disc 3' terminate in proximity to the front face 7" of the second rotor disc 3" and the rotor blades 6" of the second rotor disc 3" terminate in proximity to the front face 7' of the first rotor disc 3'.

The rotor blades 6', 6" are located in a working space interposed between the two rotor discs 3', 3".

First and second pipes 8', 8", which shall be described in detail herein below, make it possible to set the working space in fluid communication with the exterior of the containment case 2 and with a suitable circuit, which is not described in detail here. In particular, the above-mentioned pipes 8', 8" enable admission of the working fluid into a central zone of said working space, said zone being located at the axes of rotation X1, X2. Once admitted into the central zone, the working fluid expands through the rotor blades 6', 6", moving radially outwards and bringing about the rotation of the two rotor discs 3', 3" in opposite directions.

Figure 8:
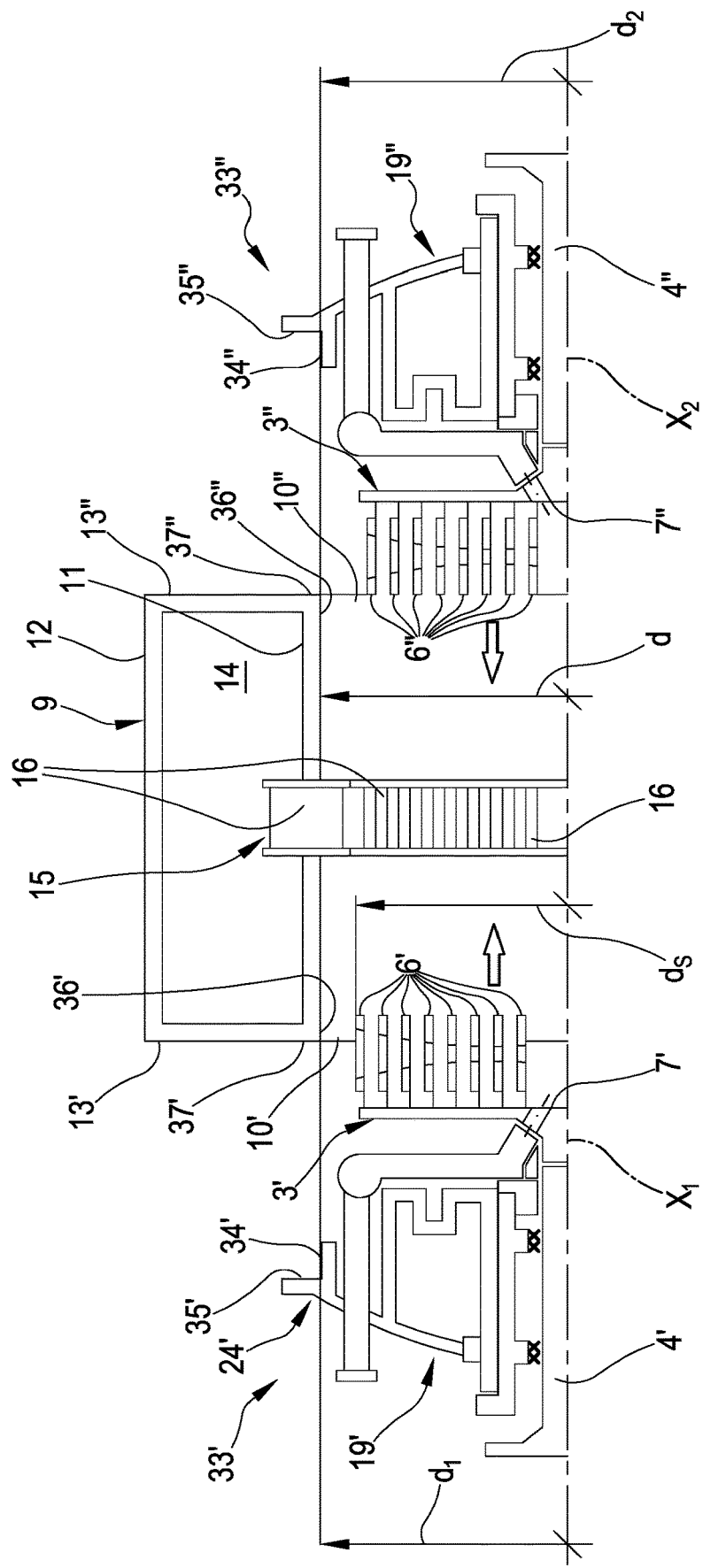
FIG. 8 illustrates a step for assembly of the turbine units with a central case.

The fixed containment case 2 comprises a central case 9 that rests on the ground or on a special base (unillustrated) by means of a support frame (unillustrated). The central case 9 is cylindrical or substantially cylindrical (barrel-shaped) in shape, and coaxial to the first and the second axis of rotation X1, X2. The central case 9 is open at axially opposite ends thereof, which thus have a first opening 10' and a second opening 10" (FIG. 8). The central case 9 comprises a radially internal cylindrical wall 11 and a radially external cylindrical wall 12, which are connected to each other by a first and a second annular lateral wall 13', 13". Said radially internal cylindrical wall 11, said radially external cylindrical wall 12, and said first and second annular lateral wall 13, 13" delimit an annular discharge space 14.

The first and the second rotor disc 3, 3" and therefore the working space as well, are contained inside the radially internal cylindrical wall 11.

The radially internal cylindrical wall 11 has a bladed diffuser 15 circumferentially arranged around the working space and configured to set the cited working space in fluid communication with the annular discharge space 14. The continuity of the radially internal cylindrical wall 11 is interrupted, at a centre plane X-X, by said bladed diffuser 15. In other words, the bladed diffuser 15 divides the radially internal cylindrical wall 11 into two opposite axial portions. The bladed diffuser 15 comprises a plurality of stator blades 16 that structurally connect said opposite axial portions of the radially internal cylindrical wall 11 and said stator blades 16 delimit together a plurality of substantially radial passages for the working fluid. The two opposite axial ends of each one of the stator blades 16 are joined to respective annular dividers 17', 17", which, in turn, are solidly connected to the two opposite axial portions of the radially internal cylindrical wall 11.

A lower portion of the radially external cylindrical wall 12 has a discharge opening 18 configured to be connected to suitable discharge conduits (not illustrated). The working fluid, which, as it expands, exits radially from the working space, flows through the bladed diffuser 15, then inside the annular discharge space 14 and then it exits from the discharge opening 18.

In the first embodiment illustrated in FIG. 1, the radially internal cylindrical wall 11, the radially external cylindrical wall 12, and the first and second annular lateral wall 13', 13" are realized as a single piece. Alternatively, the radially internal cylindrical wall 11 and the radially external cylindrical wall 12 are each realized as a single piece and then connected by means of the first and second annular lateral wall 13', 13".

The fixed containment case 2 further comprises a first half-case 19' and a second half-case 19". In the embodiments illustrated, the first half-case 19' and the second half-case 19" are symmetric with respect to the cited centre plane X-X and thus only the first half-case 19' will be described in detail.

The first half-case 19' is formed by a wall shaped in accordance with a box-like structure that can be realized as a single piece or in a number of parts. The first half-case 19' comprises a first main wall 20' and a first tubular body 21' that extends from one side of the first main wall 20'. The first main wall 20', in turn, comprises a first substantially cylindrical (cylindrical or conical) wall that encloses the first tubular body 21' and is coaxial with and radially spaced away from said first tubular body 21', and a first connection portion 23' that extends radially between the first tubular body 21' and the first substantially cylindrical wall 22', to connect them. In a section along an axial plane, as in the attached figures, the cited first connection portion 23' has a zig-zag or undulated shape to increase rigidity and to enable differential radial movement due to the thermal gradients present during operation of the turbine. The first main wall 20' also comprises a first radially external portion 24' that extends from one end of the first substantially cylindrical wall 22' axially opposite the end connected to the first connection portion 23'. The first tubular body 21', the first connection portion 23', the first substantially cylindrical wall 22' and the first radially external portion 24' are substantially S-shaped in an axial half-section. The first half-case 19' further comprises a first auxiliary annular wall 25' that extends as an appendage from the first substantially cylindrical wall 22', starting from the end of this first substantially cylindrical wall 22' axially opposite the end connected to the first connection portion 23'. This first auxiliary annular wall 25' extends radially towards the first tubular body 21' and has a first radially internal edge B1 located in proximity to a radially external surface of said first tubular body 21'. The first radially internal edge B1 grazes the radially external surface and, like a sliding block, it is free to translate axially, with respect to the first tubular body 21'. The first tubular body 21' internally delimits a first cylindrical housing A'.

The second half-case 19" comprises the same elements as the first half-case 19' and these elements are distinguished by the adjective "second" and by double apostrophes after the reference numbers for the attached figures.

The turbine 1 comprises a first rotating unit 26' and a second rotating unit 26" associated with the first half-case 19' and the second half-case 19", respectively.

The first rotating unit 26' comprises the above-mentioned first shaft 4' with the respective bearings 5. The first rotating unit 26' further comprises a first support sleeve 27' that delimits an internal seat within which the first shaft 4' is housed. The first shaft 4' is coupled to the first support sleeve 27' with radial interpositioning of the bearings 5 so that said first shaft 4' can rotate freely with respect to the first support sleeve 27'.

The second rotating unit 26" is similar to the first rotating unit 26' and it comprises the same elements, distinguished by the adjective "second" and by double apostrophes after the reference numbers for the attached figures.

The above-mentioned first pipes 8' comprise a first toroidal fitting 28' that extends about the first axis of rotation X1 and it is located at a peripheral zone of the first rotor disc 3'. The first toroidal fitting 28' of this embodiment has a substantially circular section. The first pipes 8' comprise a plurality of first radial conduits 29' that extend from the first toroidal fitting 28' and converge towards the first axis of rotation X1. In FIG. 1 attached hereto, only two first radial conduits 29' are shown, but there may be more than two of these first radial conduits 29' and they may extend in a radial pattern about said first axis of rotation X1. The first radial conduits 29' are in fluid connection with the first toroidal fitting 28' and have open ends in proximity to a radially internal portion of the first rotor disc 3', said portion being provided with first through holes 30' suitable for enabling the passage of the working fluid from the first radial conduits 29' through the first rotor disc 3' and as far as the inside of the central zone of the working space. The cited first radial conduits 29' can for example be constituted by as many pipes or afforded inside a solid disc. The first pipes 8' in FIG. 1 further comprise at least one first pipe 31' in fluid communication with the first toroidal fitting 28' and exiting from the first half-case 19'. The first pipe 31' extends starting from the respective first toroidal fitting 28' along a substantially axial direction through a first opening 32' afforded in the first half-case 19'. Outside of the first half-case 19', the first pipe 31' is connected to a suitable circuit (not illustrated).

The above-mentioned second pipes 8" are similar to the first pipes 8' and they comprise the same elements, distinguished by the adjective "second" and by double apostrophes after the reference numbers for the attached figures.

Together with the first rotating unit 26', the first rotor disc 3', and the first pipes 8', the first half-case 19' forms a first turbine unit 33'. Together with the second rotating unit 26", the second rotor disc 3", and the second pipes 8", the second half-case 19" forms a second turbine unit 33".

In accordance with the method according to the present invention, the illustrated counter-rotating radial turbine 1 is assembled as described herein below.

The method first comprises pre-assembly of each one of the two turbine units 33', 33" and then associating them with the central case 9. FIGS. 2 to 7 illustrate the steps for assembly of the first turbine unit 33', which are identical to the steps for assembly of the second turbine unit 33", which are not described in detail.

Preassembly of the first turbine unit 33' comprises preparing the first half-case 19' and mounting the first rotating unit 26' made up of the first sleeve 27' with the first shaft 4' and the respective bearings 5 (FIG. 2). Said first rotating unit 26' is inserted in the first cylindrical housing A' and the first support sleeve 27' is fixed to the first tubular body 21' of the first half-case 19' (FIGS. 2 and 3).

Pre-assembly of the first turbine unit 33' further comprises preparing the first pipes 8' as a single set that comprises the respective first toroidal fitting 28', the respective first radial conduits 29' and also the respective first pipe 31' (for example welded to each other, FIG. 4). The method then comprises axially coupling said set of first pipes 8' to the first half-case 19' (with the first sleeve 27' and the first shaft 4' already assembled, FIGS. 4 and 5). During this step, the first pipe 31' is inserted axially in the opening 32' afforded in the first half-case 19' and the first radial conduits 29' are laid against the connection portion 23' of the first main wall 20', whereas the first toroidal fitting 28' is positioned in a radially external position with respect to the first substantially cylindrical wall 22'.

At this point, a distal end E' of the first shaft 4' configured to be joined to the first rotor disc 3' protrudes from the first housing A' and it is accessible from the side of the first pipes 8', given that the open ends of the first radial conduits 29' enclose said distal end E' without obstructing it. The first rotor disc 3' is joined to and overhanging the distal end E' of the first shaft 4' by means of suitable connection devices which are not illustrated herein, for example by means of a through rod in the first shaft 4' and a Hirth joint (FIGS. 6 and 7). The first turbine unit 33' is complete (FIGS. 7 and 8). The second turbine unit 33", which is visible in its assembled form in FIG. 8, is pre-assembled in the same manner.

At this point, the first pre-assembled turbine unit 33' and the second pre-assembled turbine unit 33" are coupled to the central case 9 by axially and partially inserting said first pre-assembled turbine unit 33' and said second pre-assembled turbine unit 33" in the first opening 10' and the second opening 10" of the central case 9, respectively, the openings being axially opposite each other (FIG. 8). After coupling, the first half-case 19' and the second half-case 19" laterally close the central case 9 in a sealed manner.

For this purpose and with reference to the first turbine unit 33', the first radially external portion 24' of the first main wall 20' has an L-shaped peripheral edge in cross-section. This peripheral edge thus has a first cylindrical centring surface 34' coaxial with the first axis of rotation X1 and radially facing outwards. This peripheral edge also has a first annular reference surface 35' coaxial and perpendicular to the first axis of rotation X1 and which, during the process of coupling it with the central case 9, faces said central case 9.

The second turbine unit 33" has the same structure, in which the corresponding elements are distinguished by the adjective "second" and by double apostrophes after the reference numbers for the attached figures.

The radially internal cylindrical wall 11 of the central case 9 has a first cylindrical abutment surface 36' located at the first opening 10' and radially facing inwards, and a second cylindrical abutment surface 36" located at the second opening 10" and radially facing inwards.

The first lateral wall 13' of the central case 9 has a first annular abutment surface 37' located at the first opening 10' and the second lateral wall 13" of the central case 9 has a second annular abutment surface 37" located at the second opening 10".

During the process of coupling the first pre-assembled turbine unit 33' with the central case 9, the first cylindrical centring surface 34' is associated with the first cylindrical abutment surface 36' and, additionally, the first annular reference surface 35' is applied against the first annular abutment surface 37'. Likewise, during the process of coupling the second pre-assembled turbine unit 33" with the central case 9, the second cylindrical centring surface 34" is associated with the second cylindrical abutment surface 36" and, additionally, the second annular reference surface 35" is applied against the second annular abutment surface 37". As can be noted in the attached figures, the first and the second cylindrical abutment surface 36', 36" and the first and the second cylindrical centring surface 34', 34" have a (first and second) diameter d1, d2 equal to about 110% of a diameter ds of the outermost radial stage (that is, of the radially outermost rotor blades 6') of the first rotor disc 3' in this embodiment. Moreover, in this embodiment, the first and the second diameter d1, d2 are equal to each other and equal to an inner diameter d of the radially internal cylindrical wall 11.

Figure 9:
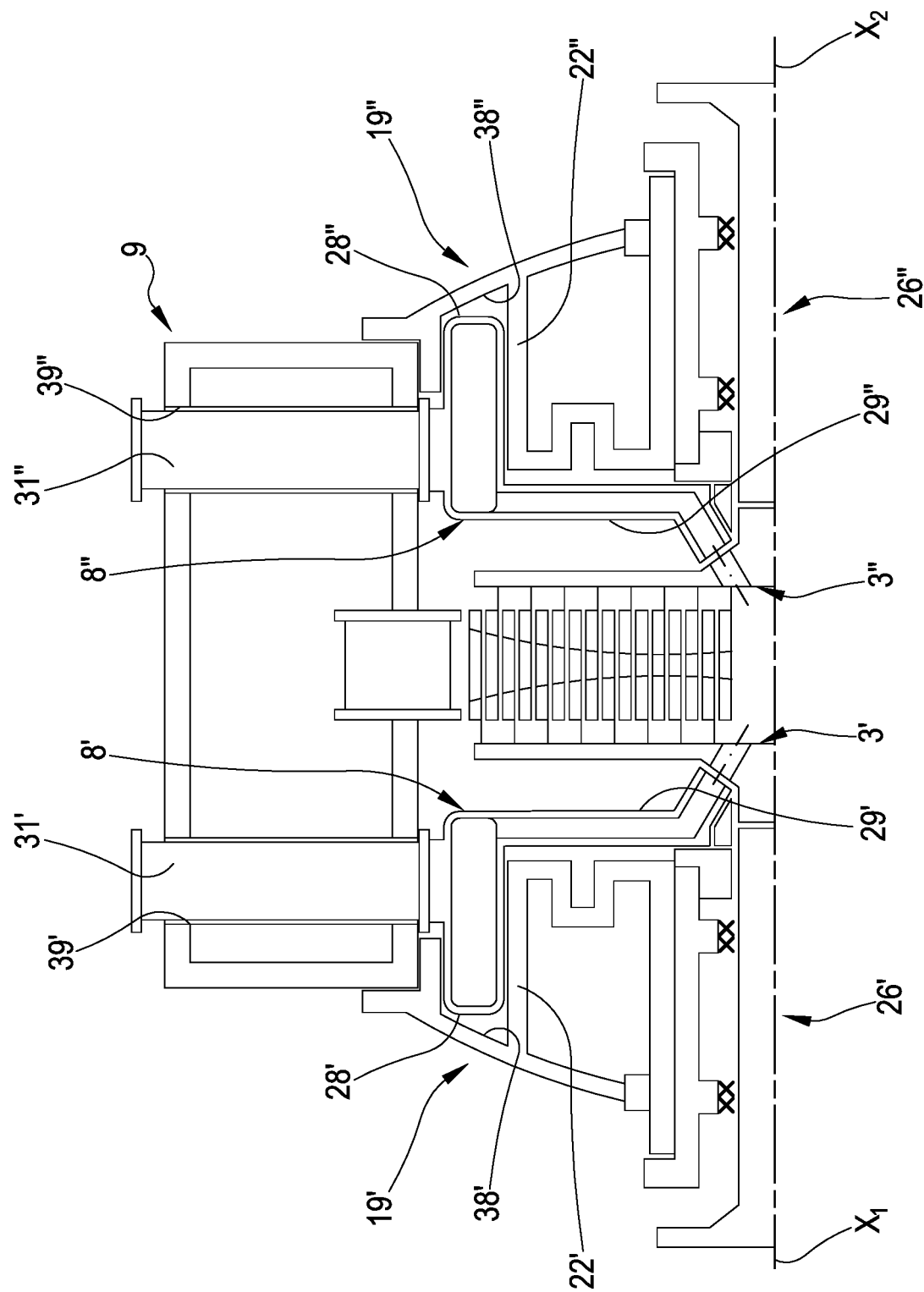
FIG. 9 shows a section view along an axial plane of a second embodiment of a turbine in accordance with the present invention.
Figure 10:
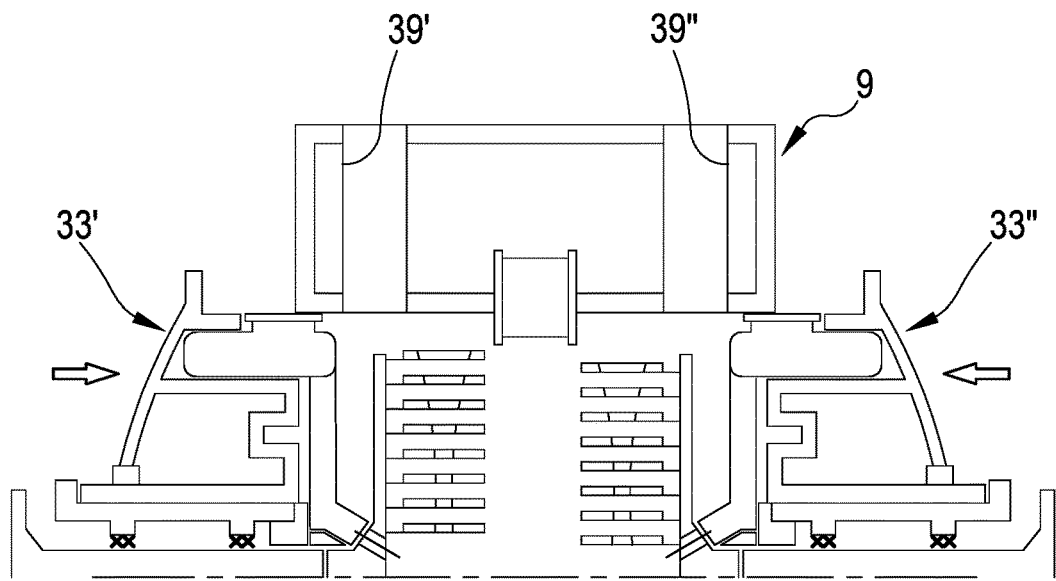
FIGS. 10 and 11 illustrate respective steps for assembly of the turbine appearing in FIG. 9.
Figure 11:
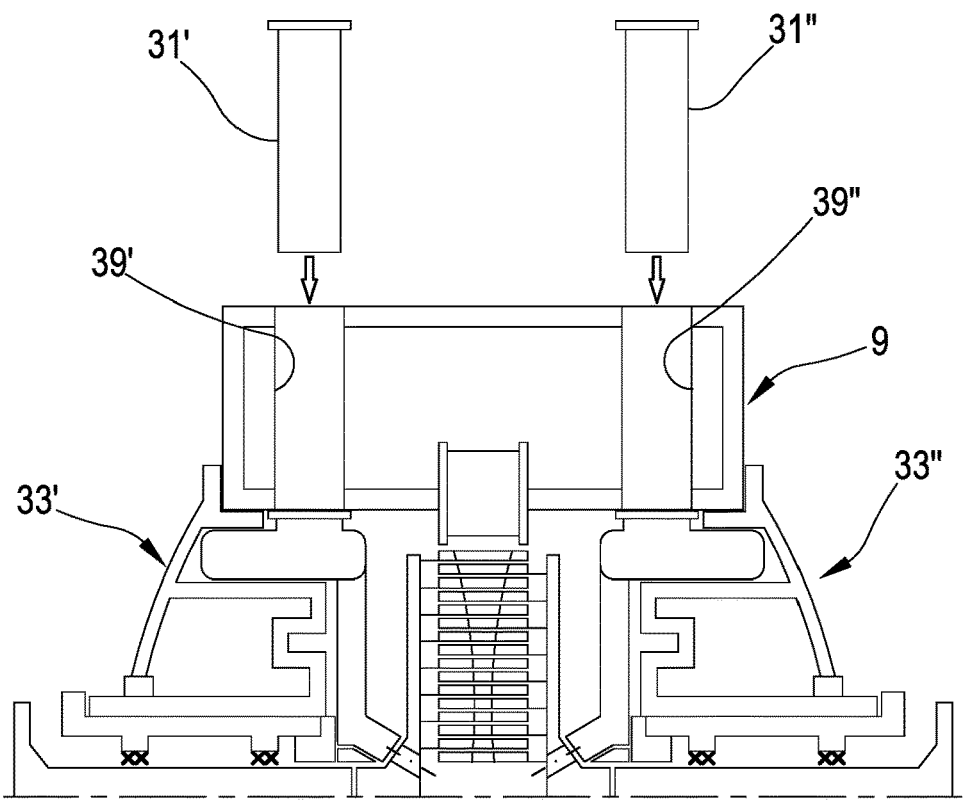

The second embodiment, which is illustrated in FIGS. 9, 10 and 11, is identical to the embodiment described above (so that the reference numbers for identical elements remain the same and, for greater clarity, they are not all reported), except for the structure of the first and second pipes 8', 8" and particularly the structure of the toroidal fittings 28', 28" and of the first and second pipe 31', 31".

The first toroidal fitting 28' has a substantially rectangular cross-section configured for partial insertion in a first annular seat 38' afforded in the first half-case 19' and that is coaxial with the first axis of rotation X1. Said first annular seat 38' is delimited by the first substantially cylindrical wall 22' and by the L-shaped peripheral edge. The first pipe 31' extends along a direction substantially perpendicular to the first axis of rotation X1 through a first passage 39' afforded in the central case 9. The first pipe 31' is connected to the first toroidal fitting 28' at a radially external portion of said first toroidal fitting 28', projects out from the central case 9 and is connected to a suitable circuit (not illustrated). The second pipes 8" have the same structure, which is symmetric, as the first pipes 8' and the second pipe 31" thereof passes through a second passage 39" afforded in the central case 9.

In this embodiment, the first pipes 8' without the first pipe 31' are coupled axially to the first half-case 19' and in the same manner, the second pipes 8" without the second pipe 31" are axially coupled to the second half-case 19".

The first pre-assembled turbine unit 33' and the second pre-assembled turbine unit 33" are then coupled to the central case 9 by axially and partially inserting said first pre-assembled turbine unit 33' and said second pre-assembled turbine unit 33" in the first opening 10' and the second opening 10" of the central case 9, respectively, the openings being axially opposite each other (FIG. 10).

Lastly, the first and the second pipe 31', 31" are inserted in the respective first and second passage 39', 39" until they are joined with the respective toroidal fittings 28', 28".

In additional embodiments (not illustrated), prior to assembly of the turbine units 33', 33", the central case 9 is divided into a first lower semi-cylinder resting on the ground and a second upper semi-cylinder, and for example said first and second semi-cylinders can be coupled in a horizontal plane containing the first and the second axis of rotation X1, X2.

For assembly purposes, the first turbine unit 33' and the second turbine unit 33", pre-assembled for example according to the procedures described and illustrated for the preceding embodiments, are first coupled axially to each other so as to arrange the annular arrays of blades in a radially alternated manner. Subsequently, the set made up of the first turbine unit 33' and by the second turbine unit 33" is set into the first lower semi-cylinder, which is open upwards. Subsequently, the second upper semi-cylinder is applied from above onto the first lower semi-cylinder, thereby closing the case. The first and the second pipes 8', 8" can be realized in the same manner as in the first embodiment or as in the second embodiment, both having been described hereinabove.

The turbine according to the invention in one of the embodiments illustrated or in other additional embodiments can be implemented in a power plant for generating electrical energy, such as thermal or geothermal or cogeneration power plants.

LIST OF ELEMENTS

1 counter-rotating radial turbine
2 fixed containment case
3', 3" first rotor disc and second rotor disc
X1, X2 first axis of rotation and second axis of rotation
4', 4" first rotation shaft and second rotation shaft
5 bearings
6', 6" rotor blades of the first and the second rotor disc
7', 7" front face of the first and the second rotor disc
8', 8" first and second pipes
9 central case
10', 10" first opening and second opening
11 radially internal cylindrical wall
12 radially external cylindrical wall
13', 13" first and second annular lateral wall
14 annular discharge space
15 bladed diffuser
X-X centre plane
16 stator blades
17', 17" annular dividers
18 discharge opening
19', 19" first half-case and second half-case
20', 20" first main wall and second main wall
21', 21" first tubular body and second tubular body
22', 22" first and second substantially cylindrical wall
23', 23" first connection portion and second connection portion
24', 24" first radially external portion and second radially external portion
25', 25" first auxiliary annular wall and second auxiliary annular wall
B1, B2 first radially internal edge and second radially internal edge
A', A" first cylindrical housing and second cylindrical housing
26', 26" first rotating unit and second rotating unit
27', 27" first support sleeve and second support sleeve
28', 28" first toroidal fitting and second toroidal fitting
29', 29" first radial conduits and second radial conduits
30', 30" first through holes and second through holes
31', 31" first pipe and second pipe
32', 32" first opening and second opening
33', 33" first turbine unit and second turbine unit
E', E" distal end of the first shaft and distal end of the second shaft
34', 34" first cylindrical centring surface and second cylindrical centring surface
35', 35" first annular reference surface and second annular reference surface
36', 36" first cylindrical abutment surface and second cylindrical abutment surface
37', 37" first annular abutment surface and second annular abutment surface
d1, d2 first diameter and second diameter
d inner diameter
ds diameter of the outermost radial stage
38', 38" first annular seat and second annular seat
39', 39" first passage and second passage

The invention claimed is:

1. A method for the assembly of a counter-rotating radial turbine, comprising:
preparing a central case;
pre-assembling a first turbine unit comprising:
a first half-case delimiting a first housing; a first rotating unit comprising a first shaft housed and rotatably supported in the first housing and that is free to rotate about a first axis of rotation with respect to said first housing; a first rotor disc joined to and overhanging a distal end of the first shaft and having a front bladed face facing the opposite side with respect to the first half-case; wherein pre-assembling the first turbine unit comprises: preparing the first half-case delimiting the first housing; preparing the first rotating unit comprising a first support sleeve and the first shaft rotatably housed in the first support sleeve; housing the first rotating unit in the first housing and fixing the first support sleeve to the first half-case;
pre-assembling a second turbine unit comprising:
a second half-case delimiting a second housing; a second rotating unit comprising a second shaft housed and rotatably supported in the second housing and that is free to rotate about a second axis of rotation with respect to said second housing; a second rotor disc joined to and overhanging a distal end of the second shaft and having a front bladed face facing the opposite side with respect to the second half-case; wherein pre-assembling the second turbine unit comprises: preparing the second half-case delimiting the second housing; preparing the second rotating unit comprising a second support sleeve and the second shaft rotatably housed in the second support sleeve; housing the second rotating unit in the second housing and fixing the second support sleeve to the second half-case;

coupling the first pre-assembled turbine unit and the second pre-assembled turbine unit to the central case so as to arrange the front bladed face of the first rotor disc in front of the front bladed face of the second rotor disc, wherein, following the coupling process, the first half-case and the second half-case laterally close the central case;

wherein pre-assembling the first turbine unit comprises: coupling first pipes to the first half-case, said first pipes being configured to set a working space delimited between the first rotor disc and the second rotor disc in fluid communication with the exterior; wherein pre-assembling the second turbine unit comprises: coupling second pipes to the second half-case, said second pipes being configured to set said working space in fluid communication with the exterior; and further comprising: pre-assembling a first set comprising the first pipes joined to each other and applying the first set of first pipes en bloc to the first half-case by means of a relative axial translational movement; pre-assembling a second set comprising the second pipes joined to each other and applying the second set of second pipes en bloc to the second half-case by means of a relative translational movement.

2. The method according to claim 1, wherein the central case has a tubular shape and wherein coupling the first pre-assembled turbine unit and the second pre-assembled turbine unit to the central case comprises: axially and at least partially inserting the first pre-assembled turbine unit and the second pre-assembled turbine unit in a first opening and in a second opening of the central case, respectively, the openings being axially opposite each other.

3. The method according to claim 1, wherein coupling the first pipes to the first half-case comprises: axially inserting at least one first pipe through a first opening afforded in the first half-case; wherein coupling the second pipes to the second half-case comprises: axially inserting at least one second pipe through a second opening afforded in the second half-case.

4. The method according to claim 1, wherein coupling the first pipes to the first half-case comprises: housing a first toroidal fitting in a first annular seat afforded in the first half-case and coaxial with the first axis of rotation; wherein coupling the second pipes to the second half-case comprises: housing a second toroidal fitting in a second annular seat afforded in the second half-case and coaxial with the second axis of rotation.

5. A method for the assembly of a counter-rotating radial turbine, comprising:

preparing a central case;

pre-assembling a first turbine unit comprising:

a first half-case delimiting a first housing; a first rotating unit comprising a first shaft housed and rotatably supported in the first housing and that is free to rotate about a first axis of rotation with respect to said first housing; a first rotor disc joined to and overhanging a distal end of the first shaft and having a front bladed face facing the opposite side with respect to the first half-case; wherein pre-assembling the first turbine unit comprises: preparing the first half-case delimiting the first housing; preparing the first rotating unit comprising a first support sleeve and the first shaft rotatably housed in the first support sleeve; housing the first rotating unit in the first housing and fixing the first support sleeve to the first half-case;

pre-assembling a second turbine unit comprising:

a second half-case delimiting a second housing; a second rotating unit comprising a second shaft housed and rotatably supported in the second housing and that is free to rotate about a second axis of rotation with respect to said second housing; a second rotor disc joined to and overhanging a distal end of the second shaft and having a front bladed face facing the opposite side with respect to the second half-case; wherein pre-assembling the second turbine unit comprises: preparing the second half-case delimiting the second housing; preparing the second rotating unit comprising a second support sleeve and the second shaft rotatably housed in the second support sleeve; housing the second rotating unit in the second housing and fixing the second support sleeve to the second half-case; and coupling the first pre-assembled turbine unit and the second pre-assembled turbine unit to the central case so as to arrange the front bladed face of the first rotor disc in front of the front bladed face of the second rotor disc, wherein, following the coupling process, the first half-case and the second half-case laterally close the central case;

wherein pre-assembling the first turbine unit comprises: coupling first pipes to the first half-case, said first pipes being configured to set a working space delimited between the first rotor disc and the second rotor disc in fluid communication with the exterior; wherein pre-assembling the second turbine unit comprises: coupling second pipes to the second half-case, said second pipes being configured to set said working space in fluid communication with the exterior; and wherein coupling the first pipes to the first half-case comprises: axially inserting at least one first pipe through a first opening afforded in the first half-case; wherein coupling the second pipes to the second half-case comprises: axially inserting at least one second pipe through a second opening afforded in the second half-case.

* * * * *